June 8, 1948.  G. W. SULLIVAN  2,443,124
FISH LURE
Filed Feb. 1, 1945

Inventor
George W. Sullivan.

By Clarence A. O'Brien
and Harvey B. Jacobson
Attorneys

Patented June 8, 1948

2,443,124

UNITED STATES PATENT OFFICE 2,443,124

FISH LURE

George W. Sullivan, Hamilton, Mont.

Application February 1, 1945, Serial No. 575,613

1 Claim. (Cl. 43—47)

This invention relates to fish lures, and the primary object of the invention is to provide a very simple and highly efficient device of this kind.

More particularly, the present invention contemplates the provision of a fish lure which has both a wobbling and spinning action in use for effectively luring the fish.

The present invention consists in the novel form, combination and arrangement of parts hereinafter more fully described, shown in the accompanying drawings and claimed.

In the drawings, wherein like reference characters indicate corresponding parts throughout the several views.

Figure 1:
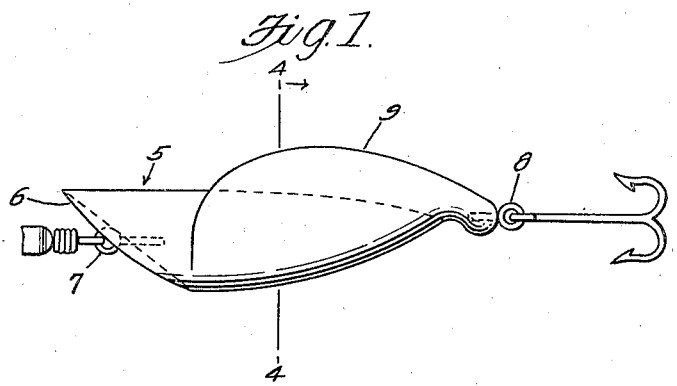
Figure 1 is a side elevational view of a fish lure constructed in accordance with the present invention.
Figure 2:
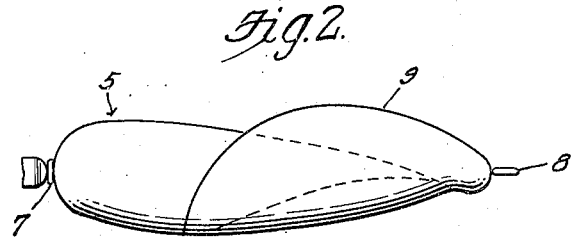
Figure 2 is a top plan view thereof.
Figure 3:
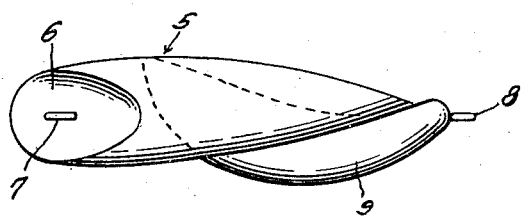
Figure 3 is a bottom plan view of the same.
Figure 4:
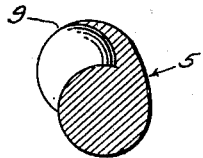
Figure 4 is a transverse section taken on line 4—4 of Figure 1.

Referring in detail to the drawings, the present fish lure comprises an elongated body 5 which tapers smaller from its nose end to its tail end and whose nose end is provided with a dished or concave downwardly and rearwardly beveled face 6. At its nose end, the body 5 is provided with a swivel connection 7 to which the fishing line is to be attached, while an eye 8 is provided at the tail end of the body 5 for attachment of an ordinary fishing hook thereto.

The body 5 is formed with a spiral flange 9 that extends from a point near the head end of the body to the tail of the latter. This flange extends laterally from one side of the body 5 at the bottom of the latter, then upwardly along the adjacent side, and then laterally over the top of the body 5 beyond the opposite side of the latter. Flange 9 decreases in width from the center to the ends thereof, and it may be formed integrally with or attached to the body 5. Also, the body and its flange may be made out of any suitable material, such as wood, aluminum or the like.

In use, as the lure is drawn forwardly, the beveled face 6 causes the lure to have a wobbling action and the flange 9 causes the body to simultaneously spin about the axis of the swivel connection 7. By this combination of movements a lure is provided which effectively attracts the fish so as to be readily caught by the hook attached to the eye 8.

It will be seen that the spiral flange 9 is of relatively large size and so related to the body 5 as to be very effective in positively rotating the body when the lure is pulled forwardly through the water. Also, the lure is comparatively simple in construction and may be conveniently and economically manufactured.

What I claim is:

A fish lure comprising an elongated body tapered smaller from one end to the other end thereof, the end face of the larger end of the body being concaved and beveled downwardly and rearwardly at an oblique angle to the longitudinal axis of said body, a swivel connection for a fishing line attached to the larger end of the body axially of the latter, and a spiral flange of relatively high pitch arranged on the outer surface of the body and comprising less than one-half of a complete convolution, said flange extending from a point at one side of the body and adjacent to the lower rearmost portion of said end face to the smaller end of the body.

GEORGE W. SULLIVAN.

REFERENCES CITED

The following references are of record in the file of this patent:

UNITED STATES PATENTS

| Number | Name | Date |
| --- | --- | --- |
| 538,169 | Kelley | Apr. 23, 1895 |
| 2,064,419 | DeWitt | Dec. 15, 1936 |
| 2,262,974 | Steiner | Nov. 18, 1941 |
| 2,306,692 | Flood | Dec. 29, 1942 |